(12) United States Patent
Kim et al.

(10) Patent No.: US 11,933,881 B2
(45) Date of Patent: Mar. 19, 2024

(54) METHOD AND APPARATUS FOR PROCESSING SOURCE DATA OF SYNTHETIC APERTURE RADAR IN SATELLITE

(71) Applicant: AJOU UNIVERSITY INDUSTRY-ACADEMIC COOPERATION FOUNDATION, Suwon-si (KR)

(72) Inventors: Jae Hyun Kim, Seoul (KR); Kyeongrok Kim, Suwon-si (KR)

(73) Assignee: Ajou University Industry-Academic Cooperation Foundation, Suwon-si (KR)

( * ) Notice: Subject to any disclaimer, the term of this patent is extended or adjusted under 35 U.S.C. 154(b) by 0 days.

(21) Appl. No.: 17/445,661

(22) Filed: Aug. 23, 2021

(65) Prior Publication Data
US 2022/0268920 A1 Aug. 25, 2022

(30) Foreign Application Priority Data
Feb. 22, 2021 (KR) .......................... 10-2021-0023244

(51) Int. Cl.
*G01S 13/90* (2006.01)
(52) U.S. Cl.
CPC .................................. *G01S 13/90* (2013.01)
(58) Field of Classification Search
CPC ............................................ G01S 13/90–9094
See application file for complete search history.

(56) References Cited

U.S. PATENT DOCUMENTS

| | | | |
|---|---|---|---|
| 4,355,311 A | 10/1982 | Jain | |
| 4,910,520 A | 3/1990 | Rosen et al. | |
| 5,343,204 A * | 8/1994 | Farmer | G01S 13/9019 342/25 F |
| 5,661,477 A * | 8/1997 | Moreira | H03M 7/3082 341/50 |
| 6,870,500 B2 * | 3/2005 | Suess | G01S 13/904 342/25 F |

(Continued)

FOREIGN PATENT DOCUMENTS

| | | |
|---|---|---|
| JP | 3462098 B2 | 11/2003 |
| KR | 10-1058773 B1 | 8/2011 |

(Continued)

OTHER PUBLICATIONS

Fusco, Adele, Antonio Pepe, Paolo Berardino, Claudio De Luca, Sabatino Buonanno, and Riccardo Lanari. 2019. "A Phase-Preserving Focusing Technique for TOPS Mode SAR Raw Data Based on Conventional Processing Methods" Sensors 19, No. 15: 3321. https://doi.org/10.3390/s19153321 (Year: 2019).*

(Continued)

*Primary Examiner* — Matthew M Barker
(74) *Attorney, Agent, or Firm* — Knobbe Martens Olson & Bear LLP

(57) ABSTRACT

Disclosed are a method and apparatus for processing source data of a synthetic aperture radar in a satellite, including receiving source data generated based on a signal returned after an electronic device steers a beam from a synthetic aperture radar and backscatters, setting a plurality of subswaths after the electronic device parses the source data, storing based on the plurality of subswaths after the electronic device decodes the source data; and generating image data after the electronic device calls the decoded source data in the order of the plurality of subswaths.

4 Claims, 3 Drawing Sheets

(56) References Cited

U.S. PATENT DOCUMENTS

| | | | | |
|---|---|---|---|---|
| 7,705,766 | B2* | 4/2010 | Lancashire | G01S 13/9054 |
| | | | | 342/25 F |
| 8,049,657 | B2* | 11/2011 | Prats | G01S 13/9056 |
| | | | | 342/25 F |
| 10,955,546 | B2* | 3/2021 | Fox | G01S 7/006 |
| 2007/0164894 | A1* | 7/2007 | Sherman | G01S 7/003 |
| | | | | 342/25 F |
| 2009/0267825 | A1* | 10/2009 | Vetro | H03M 7/4006 |
| | | | | 342/25 R |
| 2021/0132188 | A1* | 5/2021 | Wang | G01S 7/2813 |

FOREIGN PATENT DOCUMENTS

| | | | |
|---|---|---|---|
| KR | 10-2018-0115935 A | 10/2018 | |
| KR | 10-2081373 B1 | 4/2020 | |
| KR | 10-2174321 B1 | 11/2020 | |

OTHER PUBLICATIONS

Miranda, Nuno & Hajduch, Guillaume & Piantanida, Riccardo. (2020). Sentinel-1 Level-0 Data Decoding Package. 10.13140/RG.2.2.23805.38881. (Year: 2020).*

A. Anghel, R. Cacoveanu, B. Rommen and M. Datcu, "Time-Domain SAR Processor for Sentinel-1 TOPS Data," IGARSS 2020—2020 IEEE International Geoscience and Remote Sensing Symposium, Waikoloa, HI, USA, 2020, pp. 1913-1916, doi: 10.1109/IGARSS39084.2020.9324133. (Year: 2020).*

Notice of Allowance of Korean Patent Application No. 10-2021-0023244—6 pages (dated May 25, 2021).

Office Action of Korean Patent Application No. 10-2021-0023244—4 pages (dated Apr. 21, 2021).

* cited by examiner

METHOD AND APPARATUS FOR PROCESSING SOURCE DATA OF SYNTHETIC APERTURE RADAR IN SATELLITE

CROSS-REFERENCE TO RELATED APPLICATION

This application claims priority to and the benefit of Korean Patent Application No. 10-2021-0023244, filed on Feb. 22, 2021, the disclosure of which is incorporated herein by reference in its entirety.

TECHNICAL FIELD

The present disclosure relates to a method and apparatus for processing source data of a synthetic aperture radar in a satellite.

BACKGROUND ART

The synthetic aperture radar (SAR) is a radar that can acquire images of an observation area, and it is mounted on a moving platform such as an unmanned aerial vehicle, satellite and the like to steer a beam to the side of the flight path (azimuth) and backscatter, thereby securing an aperture equivalent to the flight distance by synthesizing a received signal and the original signal. This is called a synthetic aperture length, and through a compression process of signals, high-resolution image data can be obtained even with a relatively small antenna diameter. The observation modes of the SAR include a strip map mode for performing general observation without beam steering, a spotlight mode for intensively irradiating one point to observe, a scan mode for observing a wide area by steering in the distance direction, and a terrain observation with progressive scans (TOPS) mode for steering a beam for the distance and azimuth directions. Each observation mode is designed and operated according to its purpose.

Currently, Sentinel-1, which is the European Space Agency's C-band SAR satellite, is operated in the TOPS mode, and the European Space Agency provides level 0 source data, level 1 single look complex (SLC) image data, grounded range detected (CAC) image data and level 2 ocean image data of Sentinel-1 to countries in need.

Several research institutes receive level 1 image data from the European Space Agency, but also receive level 0 source data to obtain desired research results. In particular, several tools that are currently in use do not provide a processing method for level 0 source data. In addition, when it is attempted to acquire research results using level 1 SLC, images are acquired using various functions provided by the tools. The processing of level 0 source data is provided by the European Space Agency, but it does not provide an accurate procedure. In the processing of source data, the data is loaded in the order of Which the observation data is stored, and then the satellite geometry variables are parsed and the observation data is decoded. In addition, after calling the decoded source data again and aligning the same according to the flight path, it is necessary to generate level 1 images using the sorted source data, and thus, there is a disadvantage in that it takes a long time to generate the image data.

The disclosure of this section is to provide background information relating to the present disclosure. Applicant does not admit that any information contained in this section constitutes prior art.

SUMMARY

The example embodiments of the present invention provide a method and apparatus for processing source data of a synthetic aperture radar in a satellite, which parse source data according to the subswath steering a beam, store the decoded source data based on the flight path of a platform, and call the decoded source data based on the stored order to generate image data.

The method for processing source data according to an example embodiment of the present invention includes receiving source data generated based on a signal returned after an electronic device steers a beam from a synthetic aperture radar and backscatters, setting a plurality of subswaths after the electronic device parses the source data, storing based on the plurality of subswaths after the electronic device decodes the source data, and generating image data after the electronic device calls the decoded source data in the order of the plurality of sub swaths.

In addition, receiving the source data is receiving the source data including a steering direction of the beam and a flight path of the synthetic aperture radar, and information on a plurality of swaths set with the steering direction of the beam as a priority.

In addition, setting a plurality of the subswaths includes parsing the source data, confirming the steering direction of the beam and the flight path for each of the plurality of swaths based on the parsing result of the source data, and setting the plurality of sub swaths to group the plurality of swaths by having the flight path as a priority among the steering direction of the beam and the flight path.

In addition, storing based on the plurality of subswaths is decoding the source data and storing the decoded source data according to the order of the plurality of sub swaths.

Moreover, the apparatus for processing source data according to an example embodiment of the present invention includes an antenna for steering a beam from a synthetic aperture radar and receiving source data generated as a signal returned after the beam is backscattered, and a processor for parsing the source data, storing decoded source data based on a plurality of set subswaths, and calling the decoded source data in the order of the plurality of sub-swaths to generate image data.

In addition, the source data includes a steering direction of the beam and a flight path of the synthetic aperture radar, and information on a plurality of swaths set with the steering direction of the beam as a priority.

In addition, the processor parses the source data and confirms the steering direction of the beam and the flight path for each of the plurality of swaths based on the parsing result of the source data.

In addition, the processor sets the plurality of sub swaths to group the plurality of swaths by having the flight path as a priority among the steering direction of the beam and the flight path.

In addition, the apparatus further includes a memory, wherein the processor stores the decoded source data in the memory according to the order of the plurality of subswaths.

As described above, the method and apparatus for processing source data of a synthetic aperture radar in a satellite have an effect of minimizing time consumption when generating image data, by parsing source data according to the sub swath steering a beam and omitting a separate alignment operation by storing the decoded source data based on the flight path of a platform.

DETAILED DESCRIPTION OF EMBODIMENTS

Figure 1:
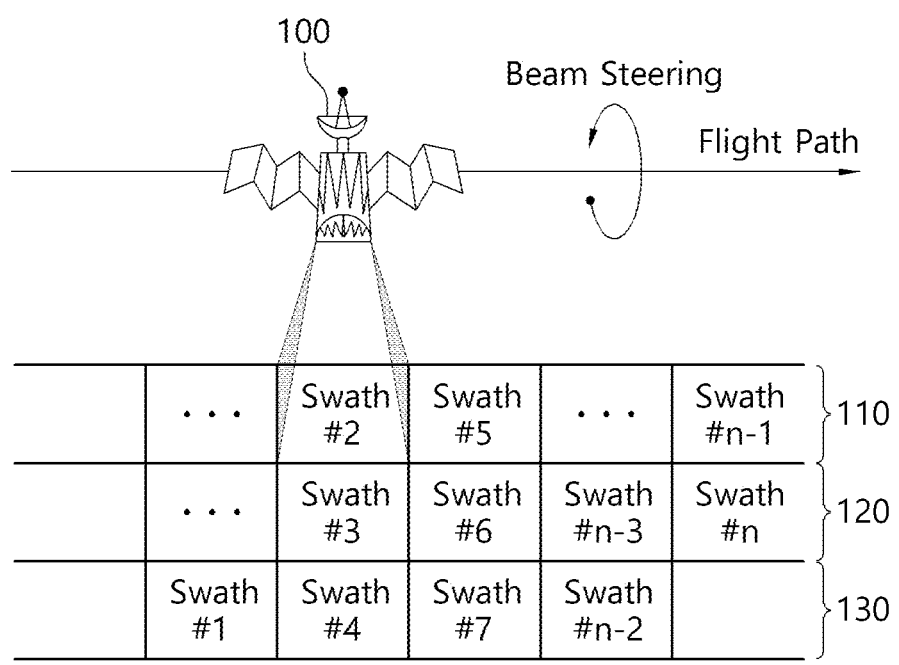
FIG. 1 is a diagram illustrating a system capable of acquiring data for an observation area according to an example embodiment of the present invention.

Hereinafter, example embodiments according to the present invention will be described in detail with reference to the accompanying drawings. The detailed description set forth below in conjunction with the accompanying drawings is intended to describe example embodiments of the present invention and is not intended to represent the only example embodiments in which the present invention may be practiced. In order to clearly describe the present invention in the drawings, parts irrelevant to the description may be omitted, and the same reference numerals may be used for the same or similar components throughout the specification.

FIG. 1 is a diagram illustrating a system capable of acquiring data for an observation area according to an example embodiment of the present invention.

Referring to FIG. 1, a system capable of acquiring data for an observation area according to embodiments of the present invention may be implemented by mounting a synthetic aperture radar (SAR) on a moving platform 100 such as an unmanned aerial vehicle, a satellite or the like. The SAR steers a beam on the side of the flight path (azimuth) of the platform 100 to the observation area, and synthesizes a backscattered and returned signal and image data to secure an aperture equivalent to the flight distance. In this case, the area or range in which the beam is steered on the ground during a given operating period of the SAR is called a swath.

A typical SAR takes the direction in which the beam is steered as a priority, and collects source data in the order of a first swath, a second swath, a third swath and a fourth swath to an n-$1^{th}$ swath and an n$^{th}$ swath by having the flight path of the platform 100 as a later priority. The SAR transmits the collected source data to an electronic device located on the ground. The electronic device parses the source data transmitted from the SAR and stores the data in the collected order by performing the decoding of the parsed source data. In the typical example method, it takes about 950 seconds to parse 50,000 pieces of source data, and about 4,500 seconds to decode the parsed source data.

Subsequently, the electronic device calls the decoded and stored source data and performs the alignment of the source data to generate image data. In this case, since the image data is generated based on the flight path of the platform 100, the electronic device must align the source data stored in the order of swaths according to the flight path. That is, the electronic device aligns a second swath and a fifth swath to an n-$1^{th}$ swath as a first subswath 110, aligns a third swath, a sixth swath, an n-$3^{th}$ swath and an n$^{th}$ swath as a second subswath 120, and aligns a first swath, a fourth swath, a seventh swath and an n-$2^{th}$ swath as a third subswath 130. In this way, it takes about 4,700 seconds to align the source data.

Finally, the electronic device generates image data for the observation area by applying the aligned source data to a focus algorithm. As described above, in the typical technology, it takes about 10,150 seconds to parse, decode and align 50,000 pieces of source data.

In order to resolve the above, the electronic device according to embodiments of the present invention does not perform an operation of aligning the decoded source data. More specifically, the electronic device parses the collected source data and sets a plurality of subswaths. The electronic device decodes the source data and stores the decoded source data based on a plurality of set subswaths. In addition, the electronic device generates image data by calling the decoded source data in the order of the plurality of subswaths.

Figure 2:
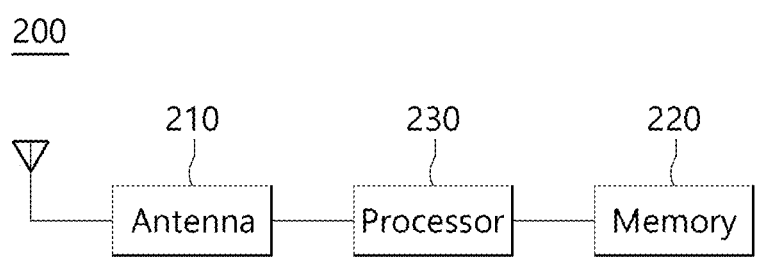
FIG. 2 is a diagram illustrating an electronic device for processing source data according to an example embodiment of the present invention.

Through this, the electronic device according to embodiments of the present invention takes about 5,450 seconds to store 50,000 pieces of source data. That is, the electronic device according to embodiments of the present invention consumes about 5,450 seconds before generating image data, which can save about 47% of the time compared to the typical method. The operation of such an electronic device will be described in detail by using FIG. 2 below. FIG. 2 is a diagram illustrating an electronic device for processing source data according to an example embodiment of the present invention.

Referring to FIG. 2, the electronic device 200 that processes source data acquired according to the movement of the platform 100 refers to an electronic device that receives and processes source data from the SAR through communication with the SAR. The electronic device 200 according to embodiments of the present invention includes an antenna 210, a memory 220 and a processor 230.

The antenna 210 receives source data acquired from the SAR through communication with the SAR and provides it to the processor 230. In this case, the SAR sequentially stores returned signals after a beam, for example, a microwave pulse is steered, and the steered beam is backscattered. More specifically, the SAR assigns a first swath value, a second swath value, a third swath value, a fourth swath to n-$1^{th}$ swath values and an n$^{th}$ swath value in the chronological order of the signals that are backscattered and returned after the beam is steered. The SAR generates source data based on signals returned after the steered beam is backscattered, and transmits it to the electronic device 200 through the antenna 210. The antenna 210 receives such source data and provides it to the processor 230.

The memory 220 stores a program for operating the electronic device 200. In particular, the memory 220 stores an algorithm for parsing source data identified based on a signal returned after a beam is backscattered, an algorithm for decoding source data, a focus algorithm for generating image data using the decoded source data and the like.

The processor 230 parses source data. Through this, the processor 230 may confirm information which is identifiable from the source data, for example, swath values, location information for an observation area corresponding to each swath and the like. The processor 230 sets the subswath to a plurality of swaths. In this case, the processor 230 sets the subswath by having the flight path of the platform 100 as a priority. For example, the processor 230 may set a second swath and a fifth swath to an n-$1^{th}$ swath as a first subswath 110, set a third swath, a sixth swath, an n-$3^{th}$ swath and an swath as a second subswath 120, and set a first swath, a fourth swath, a seventh swath and an n-$2^{th}$ swath as a third subswath 130.

The processor 230 performs decoding of the parsed source data. In this case, the processor 230 may perform flexible dynamic block adaptive quantization (FDBAQ)

decoding. The processor 230 stores the decoded source data in the memory 220. The processor 230 confirms a swath value which is assigned to the decoded source data. The processor 230 stores the decoded source data in a subswath including the confirmed swath value.

When the storage of the decoded source data in the set subswath is completed, the processor 230 calls the decoded source data for each subswath and generates image data based on the flight path of the platform 100. That is, the processor 230 generates image data by calling the source data corresponding to a second swath and a fifth swath to an $n-1^{th}$ swath included in the first subswath 110, generates image data by calling the source data corresponding to a third swath, a sixth swath, an $n-3^{th}$ swath and an $n^{th}$ swath included in the second subswath 120, and generates image data by calling the source data corresponding to a first swath, a fourth swath, a seventh swath and an $n-2^{th}$ swath included in the third subswath 130.

As described above, since the processor 230 according to embodiments of the present invention generates image data by storing and calling the decoded source data according to the order of subswaths, it is possible to save time consumed in aligning the source data, and it has an effect of minimizing the time consumed when generating image data.

Figure 3:
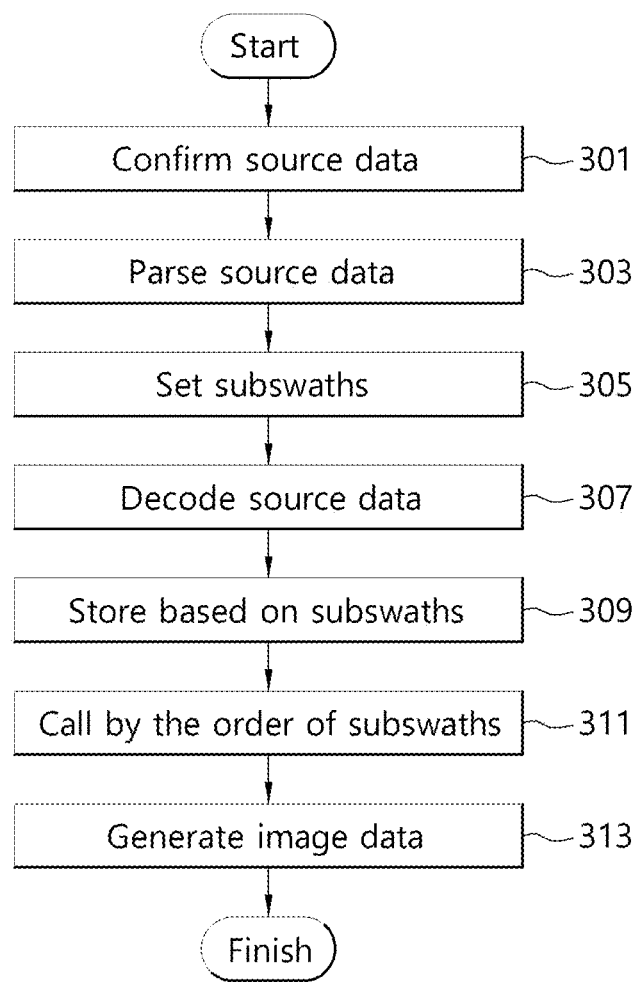
FIG. 3 is a flowchart describing a method for processing source data according to an example embodiment of the present invention.

FIG. 3 is a flowchart describing a method for processing source data according to an example embodiment of the present invention.

Referring to FIGS. 1 and 3, the processor 230 confirms source data in step 301. More specifically, the SAR assigns a first swath value, a second swath value, a third swath value, a fourth swath to $n-1^{th}$ swath values and an $n^{th}$ swath value in the chronological order of signals that are backscattered and returned after a beam is steered. The SAR generates source data based on a returned signal after the steered beam is backscattered. The processor 230 confirms the source data received from the SAR through the antenna 210.

In step 303, the processor 230 performs parsing of the confirmed source data. Through this, the processor 230 may confirm information identifiable from the source data, for example, swath values, location information for an observation area corresponding to each swath and the like.

In step 305, the processor 230 sets a plurality of subswaths. The processor 230 sets the sub swath by having the flight path of the platform 100 as a priority. For example, the processor 230 may set a second swath and a fifth swath to an $n-1^{th}$ swath as a first subswath 110, set a third swath, a sixth swath, an $n-3^{th}$ swath and an $n^{th}$ swath as a second subswath 120, and set a first swath, a fourth swath, a seventh swath and an $n-2^{th}$ swath as a third subswath 130.

In step 307, the processor 230 performs decoding of the parsed source data. In this case, the processor 230 may perform flexible dynamic block adaptive quantization (FD-BAQ) decoding. In step 309, the processor 230 stores the decoded source data in the memory 220. The processor 230 confirms a swath value which is assigned to the decoded source data. The processor 230 stores the decoded source data in a subswath including the confirmed swath value.

In step 311, the processor 230 calls the decoded source data for each subswath and performs step 313. In step 313, the processor 230 generates image data based on the flight path of the platform 100 using the called source data. More specifically, the processor 230 generates image data by calling the source data corresponding to a second swath and a fifth swath to an $n-1^{th}$ swath included in the first subswath 110, generates image data by calling the source data corresponding to a third swath, a sixth swath, an $n-3^{th}$ swath and an $n^{th}$ swath included in the second subswath 120, and generates image data by calling the source data corresponding to a first swath, a fourth swath, a seventh swath and an $n-2^{th}$ swath included in the third subswath 130.

Moreover, in an example embodiment of the present invention, step 305 is performed after step 303 as an example, but the present invention is not limited thereto, and the subswath may be performed before parsing the source data, or may be performed after decoding the source data and before storing.

Embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The example embodiments of the present invention disclosed in the present specification and drawings are merely provided for presenting specific examples in order to easily explain the technical contents of the present invention and help the understanding of the present invention, and are not intended to limit the scope of the present invention. Therefore, the scope of the present invention should be construed as including all changes or modifications derived based on the technical spirit of the present invention in addition to the example embodiments disclosed herein.

What is claimed is:

1. A method for processing source data in an electronic device, the method comprising:
    receiving, by an antenna unit of the electronic device, the source data which is generated by a synthetic aperture radar (SAR) based on a signal returned from backscattering of a beam, wherein the SAR is mounted on a platform and configured to steer the beam to an observation area in a steering direction perpendicular to a flight path of the platform, wherein the observation area includes a plurality of swaths;
    parsing, by a processor unit of the electronic device, the received source data;
    grouping, by the processor unit of the electronic device, a set of swaths of the plurality of swaths having a same angle of the steering direction along the flight path as a subswath based on the parsed source data;
    decoding, by the processor unit of the electronic device, the parsed source data;
    storing, by a memory unit of the electronic device, the decoded source data corresponding to the subswath; and
    generating, by the processor unit of the electronic device, image data by calling the decoded source data corresponding to the subswath.

2. The method of claim 1, wherein the parsing the received source data comprises checking a plurality of swath values assigned to the observation area by the SAR in a time order of the signal returned from backscattering of the beam and location information about the observation area corresponding to the plurality of swath values.

3. An apparatus for processing source data comprising:
    an antenna unit configured to receive the source data generated by a synthetic aperture radar (SAR) based on a signal returned from backscattering of a beam, wherein the SAR is mounted on a platform and configured to steer the beam to an observation area in a steering direction perpendicular to a flight path of the platform, wherein the observation area includes a plurality of swaths;
a processor unit configured to:
parse the received source data,
group a set of swaths of the plurality of swaths having a same angle of the steering direction along the flight path as a subswath based on the parsed source data,
decode the parsed source data,
and generate image data by calling the decoded source data corresponding to the subswath; and
a memory unit configured to store the decoded source data corresponding to the subswath.

4. The apparatus of claim 3, wherein the processor is configured to check a plurality of swath values assigned to the observation area by the SAR in a time order of the signal returned from backscattering of the beam and location information about the observation area corresponding to the plurality of swath values.

* * * * *